United States Patent [19]
Schneider et al.

[11] 3,851,739
[45] Dec. 3, 1974

[54] HOIST REVERSING TRANSMISSION WITH CENTRIFUGAL SPEED CONTROL

[75] Inventors: Kurt A. Schneider; Leonard H. Adams, both of Rockford; Conrad R. Hilpert, Winnebago, all of Ill.

[73] Assignee: Twin Disc, Incorporated, Racine, Wis.

[22] Filed: Sept. 4, 1973

[21] Appl. No.: 394,057

[52] U.S. Cl.............. 192/3.57, 192/3.22, 192/3.27, 74/733, 192/87.12, 254/187 R
[51] Int. Cl.............................................. F16h 5/36
[58] Field of Search .......... 192/103 FA, 3.22, 3.25, 192/3.26, 3.27, 3.33, 3.57; 74/733, 732

[56] References Cited
UNITED STATES PATENTS

| | | | |
|---|---|---|---|
| 3,202,018 | 8/1965 | Hilpert............................ | 192/3.33 X |
| 3,293,944 | 12/1966 | Hilpert............................ | 192/3.57 X |
| 3,336,820 | 8/1967 | Hilpert............................ | 192/3.27 X |
| 3,352,395 | 11/1967 | Hilpert............................ | 192/105 F |
| 3,447,397 | 6/1969 | Black et al...................... | 192/3.57 X |

*Primary Examiner*—Benjamin W. Wyche
*Attorney, Agent, or Firm*—James E. Nilles

[57] ABSTRACT

A load lowering and control system for hoist machinery, such as is found on cranes, shovels, or other types of hoists, and in which lowering system of the load is positively controlled by means of a centrifugally operated valve means which in turn controls the amount of modulation of a friction type, load lowering clutch.

2 Claims, 3 Drawing Figures

HOIST REVERSING TRANSMISSION WITH CENTRIFUGAL SPEED CONTROL

BACKGROUND OF THE INVENTION

The invention pertains to control systems for positively controlling the lowering of the load in hoist machinery, such as found in hoisting or digging implements such as cranes, shovels, hoists or the like.

The invention is an improvement over the patent to Hilpert U.S. Pat. No. 3,293,944 issued Dec. 27, 1966 and entitled "Power Transmission". That patent discloses a transmission in which the control is excited by a single lever and which provides for the application of smooth power delivery in the hoist-up or hoist-down direction. The power transmission of that patent has proved to be satisfactory for its intended purposes, but the transmission accomplished its purposes by controlling the torque on the load lowering mechanism and did not control the speed of lowering; in other words, it was not a controlled "speed-down" mechanism. Therefore, the apparatus on which such a control system was used was not controllable by the operator as to the rate of speed lowering.

Further, by way of background, the present invention utilizes a centrifugally operated valve for controlling the modulation of a friction type clutch, to thereby control the speed of either the input or output members of the clutch, such as shown in the Hilpert U.S. Pat. No. 3,352,395 issued Nov. 14, 1967 and entitled "Friction Clutch having Centrifugally Operated Valve Means". More specifically, valve 10 of the present application is like the valve D shown in FIG. 2a of the said U.S. Pat. No. 3,352,395 and valve 60 of the present application is like valve D11 of FIG. 17 but inverted.

Furthermore, the modulating valves 15 and 63 of this present application are like the modulating valves shown in the following U.S. Pats. owned by the assignee of this application: U.S. Pat. No. 3,621,955 issued Nov. 21, 1971 (valve D); U.S. Pat. No. 3,680,398 issued Aug. 1, 1972 (valve D); and U.S. Pat. No. 3,799,304 issued Mar. 26, 1974 (valve MV).

SUMMARY OF THE INVENTION

The present invention provides a control system for controlling the speed of the movement of a load on a hoist, crane, shovel, or the like, such controlling being accomplished by centrifugally operated valves which in turn controls the degree of engagement of the modulation of a friction clutch that is used to lower the load. The present invention provides such a control system wherein the load is permitting to be lowered as determined by the setting of the centrifugal valve which in turn modulates the action of the friction type, "power-down" clutch. With the present control system, the speed of the load or even the empty hook of the hoist line may be positively controlled. Even though the weight of the load or the empty hook itself is not sufficient to result in a sufficiently fast lowering speed, the control system can positively drive the hoist drum downwardly at the desired speed. Thus, if the hydrodynamic braking action of the turbine of the torque converter which is used in the present transmission is such that it prevents a sufficiently rapid lowering speed, the control apparatus can drive the shaft of the hoist mechanism in a downward direction to provide the desired downward speed.

The present invention provides a control system for the speed of a hoist mechanism in either up or down directions and which control is very smooth in operation, accurate in response, and with jerkless and stepless control.

These and other objects and advantages of the present invention will appear hereinafter as this disclosure progresses, reference being had to the accompanying drawings.

DESCRIPTION OF A PREFERRED EMBODIMENT

Figure 1:
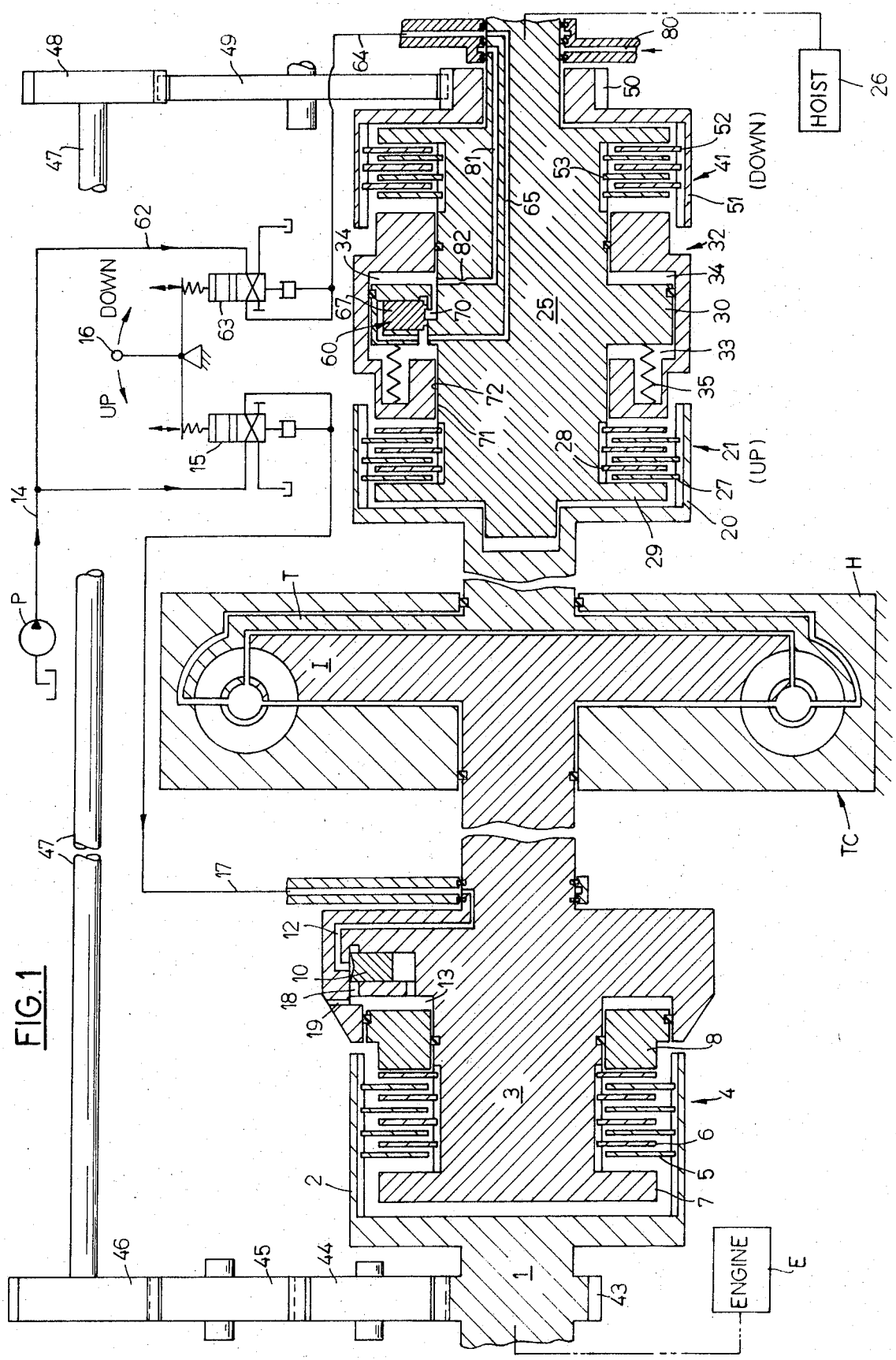
FIG. 1 is a longitudinal, cross sectional view, more or less schematic in character of a power transmission and control system therefor and which embodies the present invention.

Referring to the embodiment of the invention shown in FIG. 1, the general arrangement includes a power source such as an engine E which furnished power through the input shaft 1 to the input member such as the clutch drum 2. A shaft 3 is located within the drum 2 and a modulatable friction plate type, power input clutch 4 is provided between the drum 2 and shaft 3 so as to form a disengagable driving connection therebetween. More specifically, the power input clutch 4 contains the interleaved friction clutch plates 5 and 6 which are splined, respectively, to the drum 2 and to the shaft 3 in the well known manner. Clamp-up of these clutch plates against the back-up member 7 of the shaft 3 by the clutch piston 8, causes driving engagement between the input member 1 and the shaft 3. The degree to which the clutch plate are clamped-up can be varied, that is to say the amount of slip between the clutch plates can be varied and such a clutch is known in the art as a modulatable clutch. The degree to which the clutch is engaged is controlled by the action of a centrifugal valve 10 which is shiftable in a radial direction to control the flow of pressure fluid from passageway 12 and into the clutch piston actuating chamber 13. The pressure fluid is provided from a high pressure line 14 and passes through a shiftable valve 15 that is actuated by a single control lever 16. Thus pressure fluid can be directed from high pressure line 14 from the pressure source, such as a pump P, through valve 15, conduit 17, passage 12, and to the radially outer end of the shiftable, centrifugal valve element 10. When the shaft 3 is rotating, centrifugal force tends to shift the valve element 10 in a radially outward direction thereby tending to cut off the flow of pressure fluid from the passage 18 that places passage 12 in communication with the piston actuating chamber 13. A bleed orifice 19 extending from chamber 13 continuously bleeds pressure fluid from chamber 13. Such an arrangement of a centrifugally actuated valve 10 to control the degree of modulation of a friction type clutch is shown and described for example as valve D in FIG. 2a in the aforementioned U.S. Pat. No. 3,352,395. Therefore, it is believed sufficient to say for purposes of this disclosure that the centrifugal force acting on the valve element 10 (and the resulting radially outward force on the valve 10) is counter-acted by the amount of pressure fluid in passage 12. In this manner, the degree of engagement of the clutch 4 and consequently the speed of the shaft 3 can be regulated in accordance with the position of the control lever 16 and more specifically in accordance with the amount of pressure fluid being admitted to passage 12.

As previously mentioned, the valve 15 is similar to the aforementioned valves in said U.S. Pat. Nos. 3,621,955; 3,680,398; or 3,799,304.

Stated otherwise, moving the control lever 16 in the "up" direction, that is to the left as viewed in FIG. 1, causes pressure fluid to be applied to the passageway 12 with consequent raising of the hoist mechanism as will appear. Shifting lever 16 to the right, causes pressure in the passage 12 to be reduced, thus reducing the speed of the shaft 3 and consequently the speed of the impeller I to which it is attached. When the lever 16 is in the neutral central position as shown in FIG. 1, the clutch 4 is released, and the pressure in passage 12 is at a minimum.

The impeller I forms part of the conventional torque converter TC and this torque converter is of the type having a stationary or non-rotating housing H, and an output member or turbine T. This torque converter may be of the general type shown in the U.S. Pat. No. 3,360,935 issued Jan. 2, 1968 to Schneider and entitled "Hydraulic Torque Converter." Inasmuch as the torque converter itself is well known and conventional, a more detailed description of it is believed to be neither necessary or desirable. It is believed sufficient to say that the output member of the converter, that is the turbine T is directly connected to a drum 20 of a modulatable, normally engaged, "up" clutch 21 of the friction plate type, to be referred to.

A hoist driving shaft 25 is connected to what may be termed a hoist 26, that is that part which is used to raise or lower the load, such as a winch for winding a load cable or such as an elevationally positionable boom of an earth working shovel. The output of the torque converter, namely the drum 20 is releasably connected to the hoist drive shaft 25 by means of the clutch 21 which includes the interleaved, friction plates 27 and 28 which are axially splined, respectively, to the interior of the drum 20 and the periphery of the shaft 25. When these plates are clamped together against the back up member 29 of the shaft 25, the clutch is engaged to provide power transmission from the turbine T of the torque converter to the shaft 25. The shaft 25 has a reaction member 30 extending radially therefrom and which cooperates with an annular, compound piston assembly 32 to define a piston actuating chamber 33. A spring 35 is located in chamber 33 and acts to normally urge the piston member 32 to the left as viewed in the drawings, to consequently cause the clutch plates of clutch 21 to be engaged. Thus, clutch 21 is a normally engaged clutch and therefore normally transmits power from the torque converter to the hoist to thereby drive the hoist in the "up" direction. Thus, the clutch 21 may be considered a normally engaged "up" clutch.

A modulatable, friction plate type "down" clutch 41 is provided between the hoist driving shaft 25, which drives the hoist 26, and a reverse, constant power take-off gear means for driving the hoist in a "down" direction. In other words, power transmitting means are provided between the power source E and the "down" clutch 41. This means comprises a gear 43 fixed on shaft 1 which drives the constant mesh gear train comprising gears 44, 45, 46, shaft 47 which is fixed to gear 46 at one end and which at the other end has a gear 48 fixed thereto. Power is then transmitted from gear 48 to the constant mesh gear 49 which in turn is in constant mesh with a gear 50 formed as a hub portion of the down clutch drum 51. Interleaved clutch plates 52 and 53 are axially splined respectively, to the drum 51 and shaft 25, in the known manner and compression of these clutch plates by the piston member 32, when it shifts to the right as showed in the drawings causes a driving connection between the power shaft 1 and the hoist shaft 25. However, due to the gear train therebetween, rotation of shaft 25 is in the "down" direction, that is in the opposite direction from rotation of the shaft 1. Thus, the gear train 45–50 provides power to the hoist in the "down" direction. The speed at which the shaft 25 is rotated to drive the hoist in the down direction is determined by the degree of clamp-up or engagement of the clutch 41 as in turn determined by the action of a centrifugally operated valve means 60 which is located in the hoist shaft 25. Generally, the centrifugal valve means 60 acts to control the speed of rotation of shaft 25 and consequently the speed of lowering of the hoist 26 as will now appear.

Generally the operation of the centrifugal valve means 60 is similar to that of valve 10 and such operation and structure of valve 60 is disclosed in the said U.S. Pat. No. 3,352,395 for example in FIG. 17 thereof as valve D11, but inverted so that fluid pressure on the outer end of valve 60 tends to move valve 60 inwardly, as will presently be described. For purposes of this disclosure, it is believed sufficient to say that when the lever 16 is swung to the down position, that is to the right as shown in FIG. 1, high pressure fluid is admitted from the pump P through conduit 62, direction valve 63, conduit 64, and to the passage 65 that leads to the radially outer end of a radially shiftable valve element 67. In this manner, the pressure fluid introduced at the radially outer end of valve element 67 works in opposition to the centrifugal force imposed on the element 67 when shaft 25 is rotating, and the resulting radial position of valve element 67 determines the pressure of fluid in the actuating chamber 34 of the clutch 41. Pressurization of chamber 34 causes the piston member 32 to shift to the right, thereby causing engagement of the clutch 41 and consequent power transmission from shaft 1 through clutch 41 and to shaft 25 to the hoist mechanism to drive the latter in the lowering direction. Here again, the degree to which the clutch 41 is engaged can be varied or modulated depending on the position of handle 16 and the resulting amount of pressure fluid admitted to chamber 34. Conduit 80 provides constant pressure fluid from a source (not shown) and to a passage 81 which in turn conducts this constant pressure fluid through orifice 82 to the clutch actuating chamber 34. The arrangement is such that as long as the machine is running, this constant pressure is supplied to chamber 34. However, the actual pressure in chamber 34 is varied depending on the position of the shiftable valve element 67 as will now be described. Valve 63, previously mentioned, is like the said valves shown in said U.S. Pat. Nos. 3,621,955; 3,680,398, or 3,799,304.

Fluid pressure in passage 65 which extends to the radially outer end of the valve element 67 causes the valve element 67 to move radially inwardly, thereby restricting pressure fluid flow from the actuating chamber 34 through port 70 which is closable by the valve element 67 and its chamber 33 which is continuously bled to the sump through the radial unsealed clearance between the annular inner surface 71 of the piston 32 and the mating surface 72 of shaft 25. Fluid pressure at chamber 34 causes the piston 32 to shift to the right, thereby compressing the springs 35 in chamber 33, releasing clutch 20 and thereby removing the braking action of the turbine member T, allowing the load on the hoist to fall at a faster rate. When the speed of shaft 25 to which the hoist is connected is of a sufficient magnitude, the centrifugal force on valve element 67 will overcome the fluid pressure at the radial outer end of valve element 67, and valve element 67 will move radially outwardly thereby permitting more free flow of pressure fluid from chamber 34 and port 70 to chamber 33 and to the sump. This causes engagement of clutch 21 and generates more turbine member breaking action. The speed of shaft 25 will diminish at the point where the centrifugal force on valve 67 equals the fluid pressure at the radial outer end of valve element 67, that is the pressure in line 65 as further described in the said U.S. Pat. No. 3,352,395 of Hilpert. If the load on the hoist mechanism is light or if there is no load at all, the hook may not fall sufficiently fast when clutch 21 is completely released, and shaft 25 will not rotate or will be rotating quite slowly. The centrigugal valve element 67 will then be in a radially inner position and will restrict the flow of pressure fluid from port 70 to chamber 33 and to sump; piston member 34 will continue to move to the right, that is away from clutch plates 27 and 28 and towards the clutch plates 52 and 53 and will engage the clutch 41 which in turn is being driven in the load "down" direction by the gear mechanism 45–50. The clutch 41 will thereby drive the shaft 25 in the downward direction. The speed of rotation of the shaft and consequently the load, will again be reduced and level off when the centrifugal force of the shiftable valve element 67 is equal to the operator supplied fluid pressure in passage 65 and at the radial outer end of the valve element 67, as regulated by the operator controlled flow valve 63. In order to slightly decrease the speed of or stop the descent of the load, the operator lever 16 is moved to the left, that is to the "up" direction an amount which reduces the pressure at passage 65, thereby producing a lower speed at which the centrifugal valve element 67 is balanced by reducing the power transmitted by clutch 41, or increasing the turbine member braking effect of clutch 21. Continued movement of the operator lever 16 in the "up" direction will engage the clutch 4, thereby causing the impeller I to rotate and develop considerable torque of the turbine member in the load raising direction.

A load on the hoist mechanism may be held stationary by permitting fluid pressure to conduit 17 in a sufficient amount to shift valve element 10 and permit the shaft 3 to turn at sufficient speed to rotate the impeller at a speed where the torque of the turbine member exactly equals the load on the hoist.

Thus, a very smooth and continuous speed control of the load is provided by moving the control lever 16 in the proper direction to thereby produce increasingly greater amounts of the desired transmission of power in the hoist-up, hoist-down or hoist-holding directions.

Figure 2:
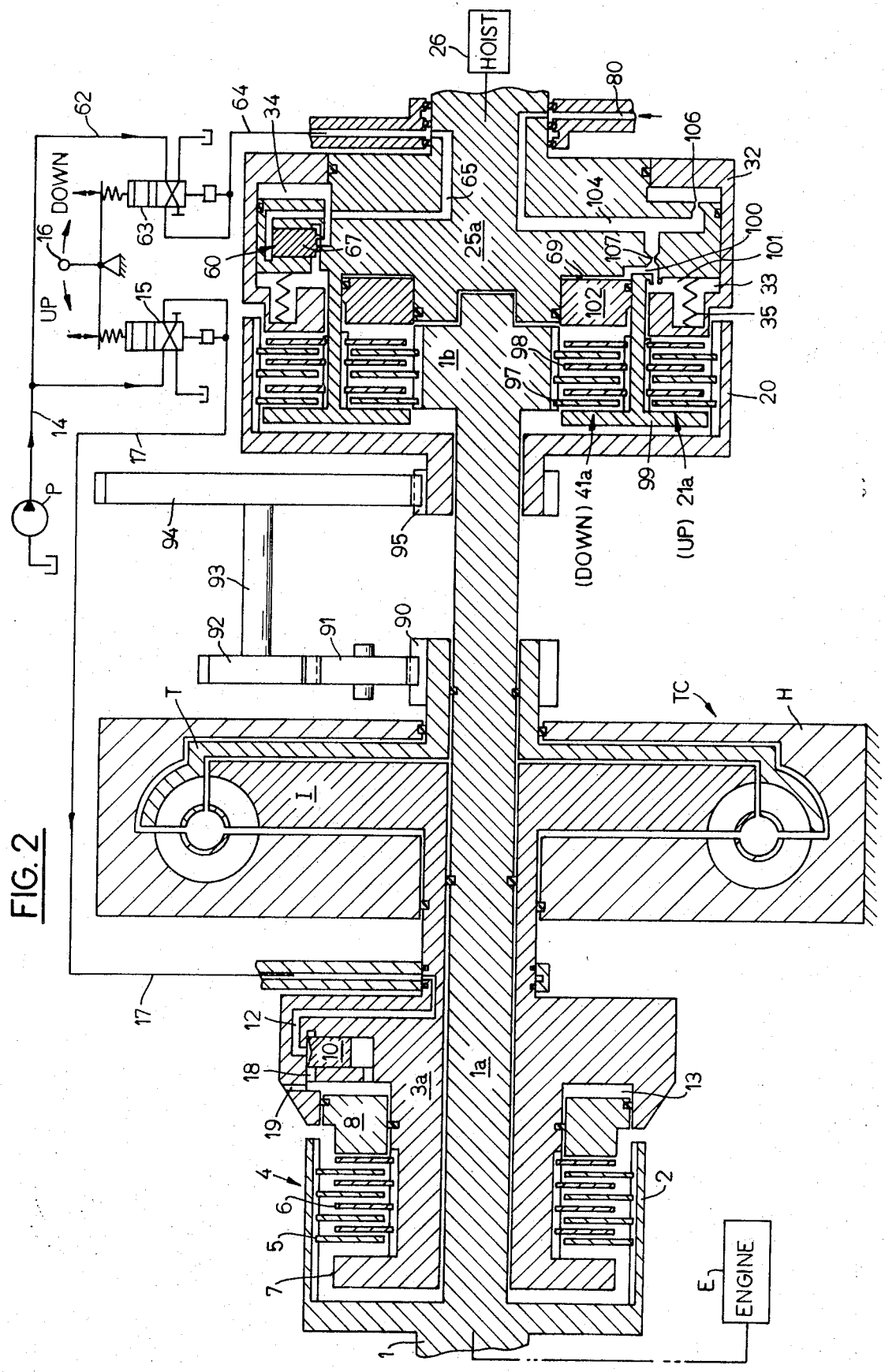
FIG. 2 is a view similar to FIG. 1, but showing a modification.

The FIG. 2 modification of the invention utilizes many similar parts to the embodiment shown in FIG. 1 and corresponding parts have been correspondingly numbered. In FIG. 2, the power input to the impeller I is also through the clutch 4 but is through the tubular member 3a. The shaft 1 however has a central portion 1a which extends centrally as a live shaft through the center of the torque converter and its rear end terminates in a hub 1b and is arranged concentrically within the "down" clutch 41a and the radially outer "up" clutch 21a that is connected to the torque converter turbine member T. More specifically, the turbine member T has a gear member 90 which drives through the constant mesh gears 91, 92, shaft 93, gear 94 and then through a gear 95 on the hub of the clutch drum 20. The hub 1b of shaft 1 through the interleaved clutch plates 97 and 98 axially splined, respectively, on the hub 1b and a portion 99 of the hoist shaft 25a in the load lowering direction, which direction is opposite to that in which "up" clutch 21a drives shaft 25a in the load raising direction. Thus, the "down" clutch 41a connects the hoist shaft 25a directly to the power source so as to be able to drive drum 20 in a downward direction. Clutch 21a on the other hand connects the turbine member of the torque converter, through the gearing arrangement 90–95, to the shaft 25a to drive the latter in the "up" or load raising position.

A centrifugally operated valve is also provided in shaft 25a, and is similar to the centrifugal valve structure and operation as used in the FIG. 1 embodiment in shaft 25 and similar parts have been similarly numbered. It is believed sufficient to say that the load raising clutch 21a is again normally engaged by the spring 35 while the power-down clutch 41a is actuated or modulated by the action of the centrifugal valve element 67. Thus, the clutch arrangement is functionally the same as that shown in FIG. 1 wherein clutches 21a, 41a, and 4 are operable to raise or lower the load, or hold it in a fixed position.

With this arrangement, the clutch 21a is normally engaged when the lever 16 is in the "up" area of its movement, thereby pressurizing the passage 12 leading to the radial outer end of the valve element 10 of the input clutch, and consequently holding the pressure in line 65 at its lowest value. When the lever 16 is moved to the "down" area, that is to the right, fluid pressure is applied to passage 65 and valve element 67 moves radially inwardly thereby restricting the flow of fluid pressure from chamber 34 to chamber 33 and to the sump via the radial clearance between piston 32 and portion 99 of shaft 25a. Then the pressure of the fluid building up at chamber 34 acts to shift the piston 32 to the right, compressing springs 35, releasing clutch 21a and allowing the load on the hoist to lower at a faster rate thus increasing the speed of shaft 25a to the hoist mechanism. When the speed of shaft 25a permits the centrifugal force on valve element 67 to balance the pressure at passage 65, the element 67 does not further increase the pressure at chamber 34 and therefore the speed of shaft 25a decreases and levels off.

In the event that the release of clutch 21a does not take place sufficiently rapidly, lowering of the load will restrict the flow of fluid from chamber 34 to chamber 33 and to sump and the piston 32 will restrict flow from passage 100 to 101 to sump. Pressure build-up at 100 will cause the piston 102 to engage the clutch 41a, driving the shaft 25a and the hoist in a downward direction.

Here again, the speed of shaft 25a will act on the radially shiftable valve element 67, causing a levelling off of the speed, depending on the fluid pressure at passage 65. Pressure at chamber 34 and at passage 100 is continuously supplied by the clutch pressure apply line 104 and then through orifices 106 and 107, respectively. As long as the machinery, on which the hoist is used, is running, this constant pressure is supplied to passage 104 from a pressure fluid source (not shown).

Figure 3:
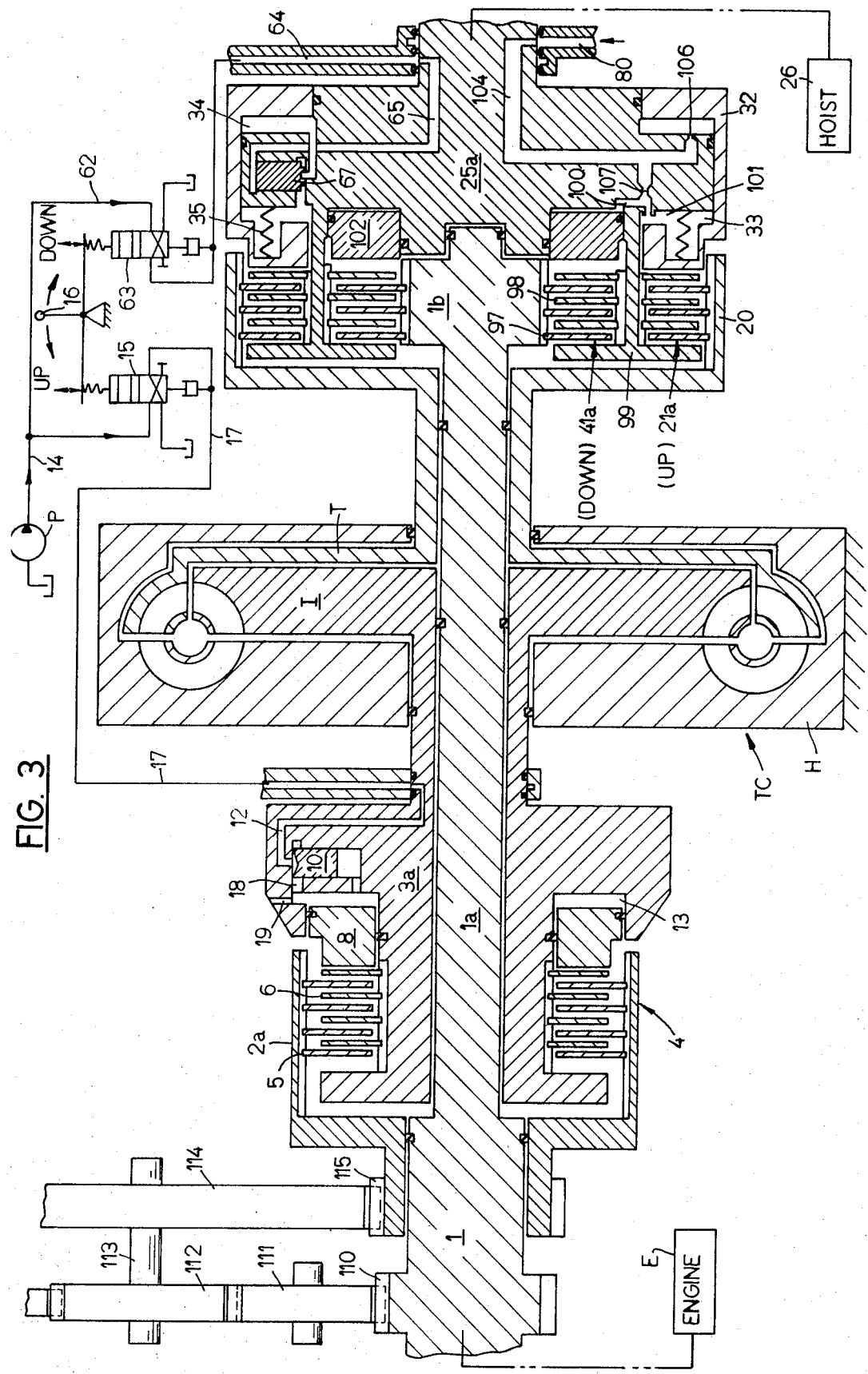
FIG. 3 is a view similar to FIG. 1, but showing still a further modification of the invention.

This modification of the invention also includes many parts which are similar to FIGS. 1 and 2 and corresponding parts have been correspondingly identified. In this FIG. 3 embodiment however, gears 110, 111, 112, shaft 113, gear 114, and the gear member 115 on the hub of drum 2a act to transmit power from the power source to the input clutch 4. Shaft 1 has a central portion 1a, constituting a power transmitting means, extending through the center of the torque converter for furnishing power to the "down" clutch 41a as in FIG. 2.

RECAPITULATION

The present invention provides a power transmission having a modulatable friction type clutch for regulating the power delivered to a torque converter and the torque converter output is connected to another normally engaged, friction type hydraulically actuated clutch which is controllably modulated by a centrifugally actuated valve, and thus, the output of the turbine to the hoist mechanism is positively controlled. With the present arrangement, the load on the hoist mechanism is allowed to "fall" only as determined by the centrifugally operated valve of the normally engaged friction clutch, that is to say, the modulated clutch is engaged additionally to limit the maximum speed of fall. A single control lever for the hydraulic system smoothly, accurately, and positively controls both the raising and lowering speeds of the hoist. The amount of torque at the hoist will vary depending on the precise hoist speed desired.

We claim:

1. A power transmission and control system for raising and lowering hoist mechanism comprising, a power source, a torque converter connected to said power source and driven thereby, a modulatable friction type input clutch disengagably connected between said power source and said torque converter, centrifugally actuated hydraulic valve means connected with said modulatable clutch for regulating the output speed of said clutch and the input speed of said torque converter, a modulatable friction type "up" clutch connected to said torque converter for being driven thereby and also being connected to a hoist mechanism driving shaft for driving said hoist mechanism in a load raising position when said "up" clutch is engaged, a modulatable friction type "down" clutch connected to said hoist mmechanism driving shaft, power transmitting means connected between said power source and said friction type "down" clutch, and centrifugally actuated hydraulic valve means connected to said "up" and "down" clutches for causing selective engagement of said "up" clutch or said "down" clutch whereby when said "up" clutch is disengaged and said "down" clutch is engaged, said power transmitting means transmits power from said power source through said "down" clutch and to said hoist mechanism to drive the latter positively in a load lowering direction and to automatically release said "down" clutch and engage said "up" clutch during overspeed of said hoist mechanism, and control means for regulating both of said centrifugally actuated hydraulic valve means.

2. A power transmission and control system for raising and lowering hoist mechanism of a machine and comprising, a power source, a torque converter connected to said power source and having an impeller driven thereby and also having a turbine member driven by said impeller, a modulatable friction type input clutch disengagably connected between said power source and said impeller, centrifugally actuated hydraulic valve means connected with said modulatable clutch for regulating the output speed of said clutch and the input speed of said torque converter. a normally engaged and modulatable friction plate type "up" clutch connected to said turbine member of said torque converter for being driven thereby and said normally engaged "up" clutch also being connected to a hoist mechanism driving shaft for driving said hoist mechanism in a load raising position when said normally engaged "up" clutch is engaged, a modulatable friction plate type "down" clutch connected to said hoist mechanism driving shaft, power transmitting means connected between said power source and said friction plate type "down" clutch, and centrifugally actuated hydraulic valve means connected to said "up" and "down" clutches for causing selective engagement of said normally engaged "up" clutch or said "down" clutch whereby when said normally engaged "up" clutch is disengaged and said "down" clutch is engaged, said power transmitting means transmits power from said power source through said "down" clutch and to said hoist mechanism to drive the latter positively in a load lowering direction and to automatically release said "down" clutch and engage said "up" clutch during overspeed of said hoist mechanism, and control means for regulating the fluid pressure selectively to said centrifugally actuated hydraulic valve means of said modulatable friction plate type input clutch and to said centrifugal valve means of said normally engaged "up" clutch and "down" clutch.

* * * * *